United States Patent
Campbell et al.

(10) Patent No.: US 6,880,231 B2
(45) Date of Patent: Apr. 19, 2005

(54) ELECTRIC MOTOR AND METHOD FOR REDUCING END PLAY

(75) Inventors: Robert Campbell, Apex, NC (US); James Joseph Misner, Scottsville, NY (US); Russell Clint Proctor, Apex, NC (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/651,873

(22) Filed: Aug. 29, 2003

(65) Prior Publication Data

US 2005/0046292 A1 Mar. 3, 2005

(51) Int. Cl.[7] .............................................. H02K 15/02
(52) U.S. Cl. .......................... 29/596; 29/598; 310/89; 310/90
(58) Field of Search ................. 29/596–598; 310/89–91

(56) References Cited

U.S. PATENT DOCUMENTS

| | | |
|---|---|---|
| 3,624,434 A | 11/1971 | Dafler et al. |
| 3,786,561 A * | 1/1974 | Busian ........................ 29/598 |
| 3,894,256 A | 7/1975 | Sholtz |
| 4,031,610 A | 6/1977 | Singh et al. |
| 4,227,104 A | 10/1980 | Hamman |
| 4,403,910 A | 9/1983 | Watanabe et al. |
| 4,888,508 A * | 12/1989 | Adam et al. ................... 310/42 |
| 4,899,432 A * | 2/1990 | Adam et al. ................... 29/596 |
| 5,087,847 A | 2/1992 | Giesbert et al. |
| 5,144,738 A | 9/1992 | Ovafuso |
| 5,325,736 A | 7/1994 | Tsujita |
| 5,485,044 A | 1/1996 | Mackay et al. |
| 5,517,070 A | 5/1996 | Schmidt |
| 5,794,326 A | 8/1998 | Kikly |
| 5,806,169 A * | 9/1998 | Trago et al. ................... 29/596 |
| 5,957,672 A | 9/1999 | Aber |
| 5,973,429 A | 10/1999 | Swensgard et al. |
| 5,977,666 A | 11/1999 | Horski et al. |
| 6,075,300 A | 6/2000 | Moss et al. |
| 6,182,350 B1 * | 2/2001 | Iwata et al. ................... 29/598 |
| 6,351,047 B1 * | 2/2002 | Hanneken ..................... 310/90 |

* cited by examiner

Primary Examiner—Thanh Lam
(74) Attorney, Agent, or Firm—Jacox Meckstroth & Jenkins (57) ABSTRACT

An electric motor and method for reducing or eliminating end play. The motor comprises an adjustment member that cooperates with an end lamina member to facilitate reducing end play. The adjustment member is slidably mounted on an armature shaft and inside an aperture of a portion of the end lamina tube to reduce or eliminate end play. Thereafter, the adjustment member is permanently secured to the end lamina tube. In another illustrative embodiment, the movable bearing retainer sets endplay and also retains brushes in an open position prior to, for example, assembly of the motor.

25 Claims, 9 Drawing Sheets

ELECTRIC MOTOR AND METHOD FOR REDUCING END PLAY

BACKGROUND OF THE INVENTION

1. Field of the Invention

This invention relates to electric motors and, more particularly, to an electric motor having an adjustment member situated on an armature shaft and cooperating with another member to reduce or eliminate armature axial end play, thereby reducing noise, heat and undesired vibration.

2. Description of Related Art

A conventional motor shaft is fastened to a driven member, such as a window lift linkage or assembly, a drive gear or the like, a blower wheel or fan or the like, so that rotational motion can be transferred from the shaft to the driven member.

Due to various factors, such as tolerances in the length of the lamina stack, bearings, motor end caps, end laminas, motor frame, commutator axial position, and the like, a gap, or often called end play, can result between the bearing axial thrust surface(s) and the axial thrust surface(s) on the armature. End play that is excessive in nature can cause the armature assembly to travel axially between the bearings which support the armature shaft, potentially causing undesirable noise and/or vibration. Too little end play, or sometimes called negative end play, can cause undesired noise, heat, and premature failure.

Automotive manufacturers and motor manufacturers have undertaken efforts to minimize this end play distance. One conventional approach incorporates either hard or resilient washers that are positioned between the armature and bearing thrust surface(s) to resist movement of the armature relative to the frame. Other noise suppression approaches include the use of noise absorption materials and barriers within the motors. Still another approach is to assemble a retainer to the external portion of the armature shaft, in close proximity to the external face of one of the bearings. Armature axial travel is limited in one direction by the retainer on the outside of the motor and in the other direction by the internal thrust surface on the armature.

There is a need to provide a further solution for effective suppression of vibration and noise in a new approach to reducing or eliminating end play in an electric motor.

SUMMARY OF THE INVENTION

It is, therefore, a primary object of the invention to provide a system and method for reducing or eliminating end play.

Another object of the invention is to provide a system and method that facilitates adjusting an end play distance to a predetermined amount, and to permanently affix or lock-in the endplay at the desired magnitude.

In one aspect, this invention comprises an adjustment member for mounting on an armature shaft, comprising a first member dimensioned to be received on the armature shaft, and to be received in a second member in order to adjust an end play distance.

In another aspect, this invention comprises an electric motor comprising a motor housing for receiving a stator operatively associated with a rotor comprising a lamina stack comprising an end-lamina tube, the lamina stack being in operative relationship with the stator, an armature shaft; and an adjustment member dimensioned to be received on the armature shaft and be received in an end lamina tube assembly, the adjustment member being slidable on the armature shaft in order to adjust an end play distance.

In still another aspect, this invention comprises a method for controlling an end play distance in an electrical motor, the electric motor comprising a motor housing for receiving a stator operatively associated with a rotor mounted on an armature when the armature is received in the motor housing, the motor comprising a lamina stack and an end-lamina tube, the lamina stack being operatively related to the stator when the rotor is situated in the housing, the method comprising the steps of providing an adjustment member dimensioned to be received on the armature shaft and be received in the end lamina member, slidably mounting the adjustment member onto the armature; positioning the end lamina member onto the armature having the lamina stack until at least a portion of the adjustment member is received with the end lamina member, thereby providing an armature assembly, positioning the armature assembly in the motor housing, situating an end cap on the motor housing until the bearing engages the adjustment member and securing the end lamina member onto the adjustment member.

These and other objects and advantages of the invention will be apparent from the following description, the accompanying drawings and the appended claims.

DETAILED DESCRIPTION OF PREFERRED EMBODIMENT

Figure 1:
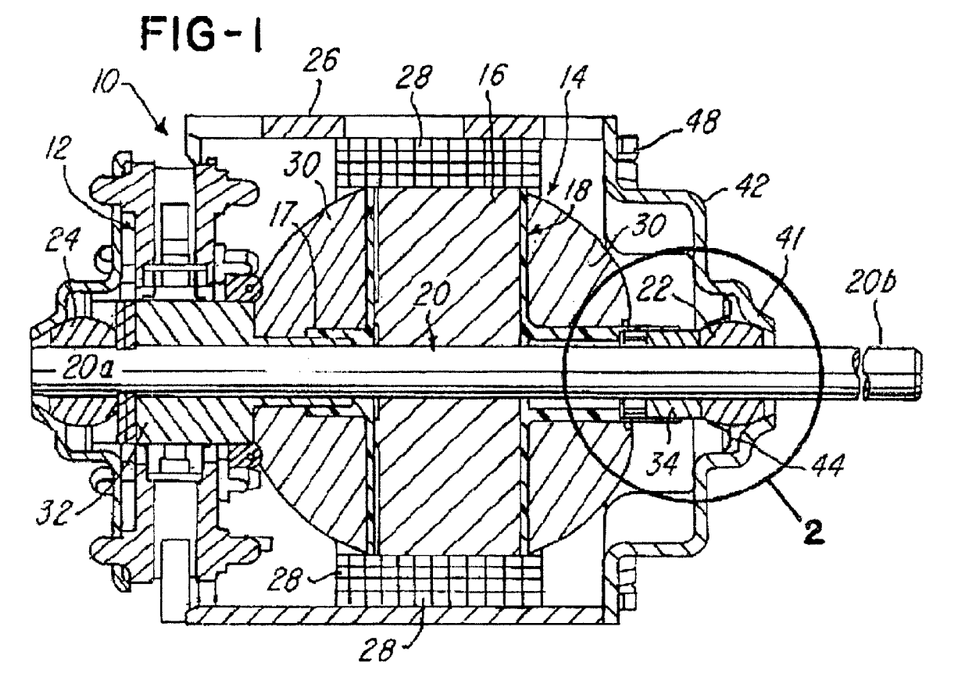
FIG. 1 is a sectional view of an adjustment member and end lamina tube in accordance with one embodiment of the invention.

Referring now to FIGS. 1–13, an electric motor 10 is shown. The motor 10 comprises a conventional brush card and an end cap assembly 12. The motor 10 further comprises an armature assembly 14 having a plurality of lamina 16 (best shown in FIG. 6), a front end lamina tube 17, and a rear end lamina tube 18 (FIGS. 1, 2, 3, 5, 6, 7, 11 and 13) situated on the armature shaft 20 adjacent the lamina 16, as illustrated in FIG. 1. The shaft 20 is rotatably received in bearings 22 and 24, as is also illustrated in FIG. 1.

The motor 10 further comprises a housing 26 having magnets 28 that become operatively associated with the lamina 16 and wire windings 30. When the armature assembly 14 is situated in the housing 26, the magnets 28 become operatively associated with the lamina 16 and windings 30. As is conventionally known, when a current is applied through the brush card to a commutator 32 and ultimately to windings 30, the armature shaft 20 rotates and drives a driven member (not shown) attached to shaft 20 to perform useful work.

Figure 5:
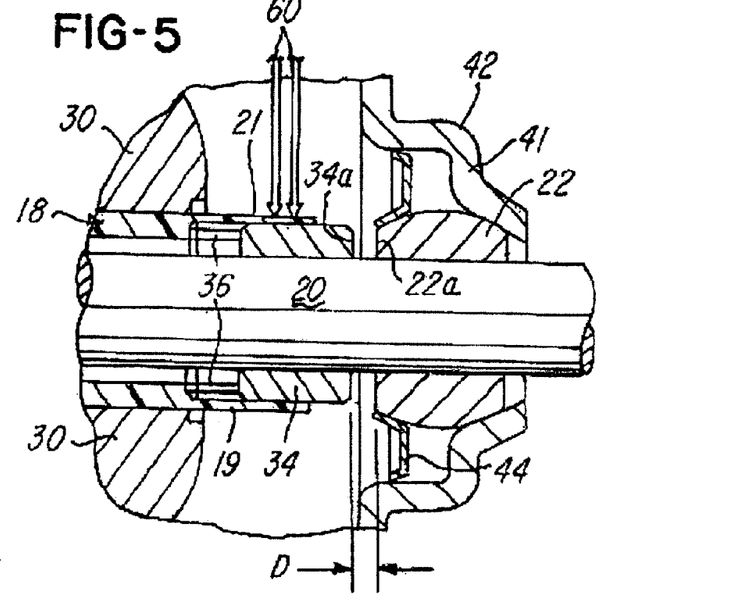
FIG. 5 is a sectional fragmentary view similar to FIG. 2, illustrating various features of the invention.
Figure 6:
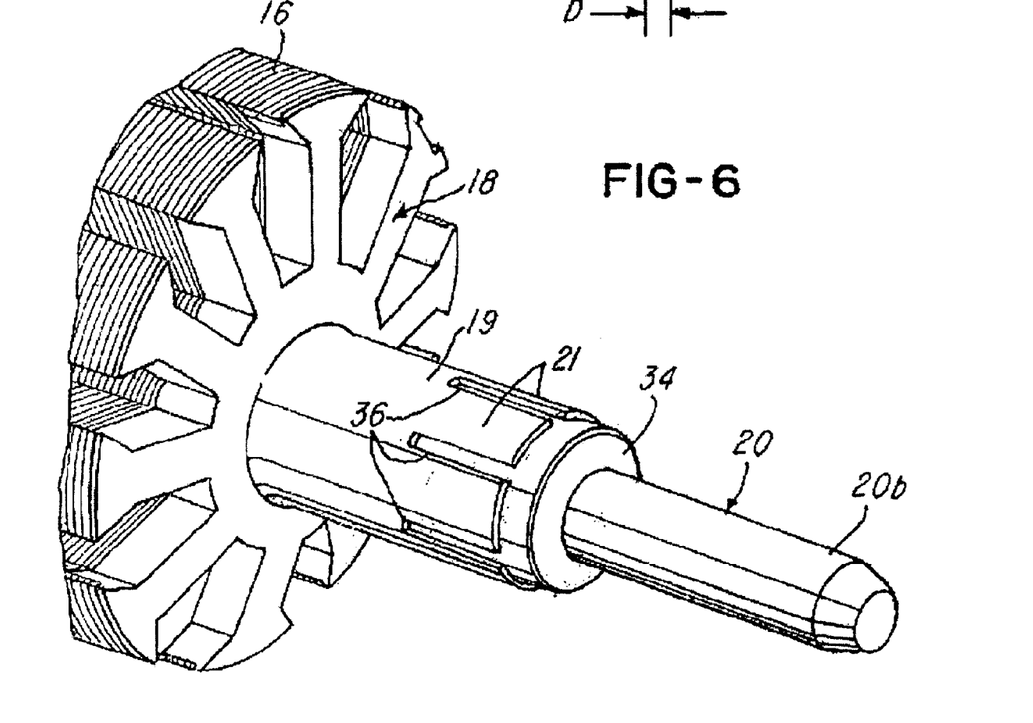
FIG. 6 is an enlarged view illustrating the slotted cylindrical wall of an end lamina tube after receiving an adjustment member.
Figure 7:
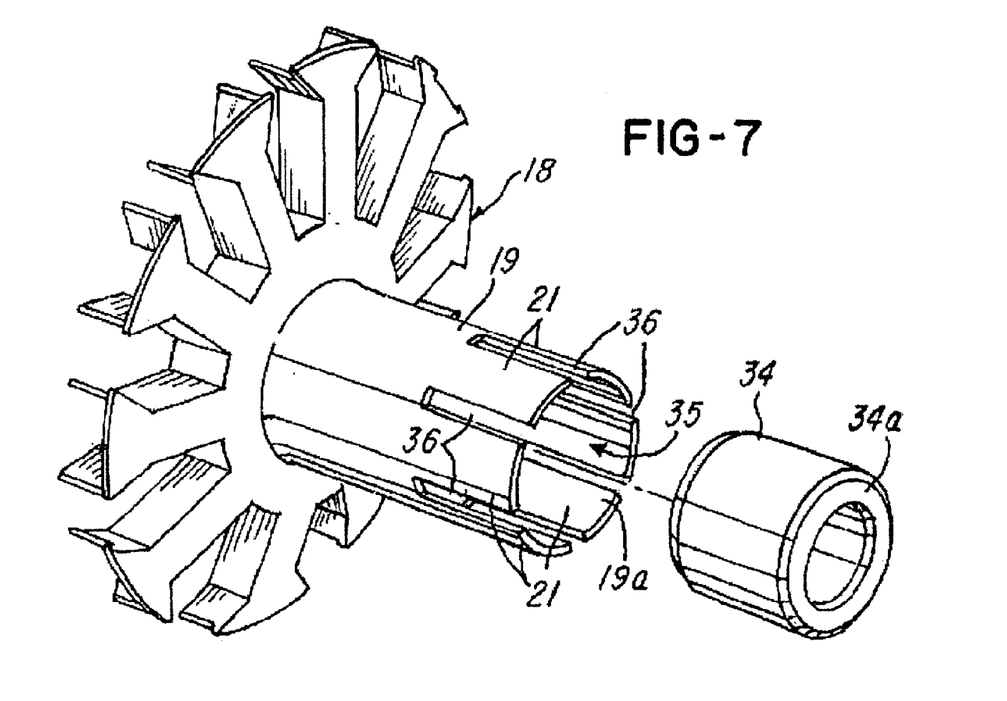
FIG. 7 is a perspective view of the end lamina tube and adjustment member.
Figure 11:
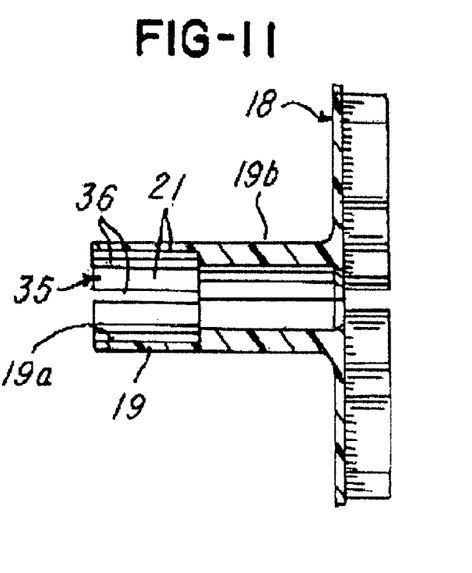
FIG. 11 is a sectional view taken along the line 11—11 in FIG. 10.
Figure 12:
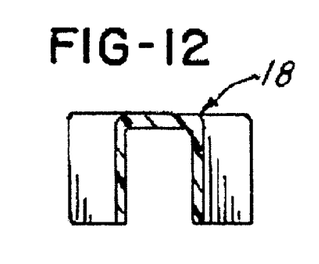
FIG. 12 is a sectional view taken along the line 12—12 in FIG. 11.
Figure 13:
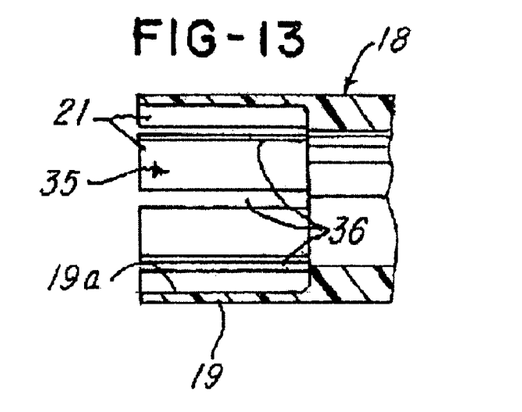
FIG. 13 is an enlarged view of a portion of FIG. 11.

As shown in FIGS. 11–13, the end lamina 18 comprises a member portion 19 having an interior wall surface 19a and exterior wall surface 19b. The member portion 19, as shown in FIGS. 5, 6, and 7, comprises a plurality of slots 36 which define wall segments 21. The wall segments 21 are resilient and can flex or move radially to accommodate an outside diameter of an adjustment member 34 when it is inserted into an opening 35 (FIG. 7), as described later herein.

Figure 2:
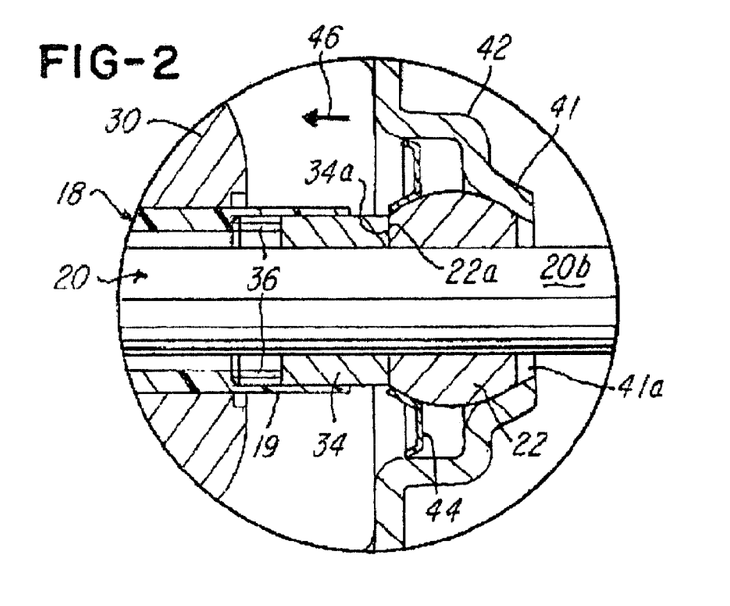
FIG. 2 is a fragmentary exploded view of the encircled portion illustrated in FIG. 1.

As illustrated in FIGS. 1, 2 and 5, the motor 10 further comprises the adjustment member 34, which is dimensioned to be situated with a slip fit on the armature shaft 20. The adjustment member 34 is further situated inside the interior wall 19a (FIGS. 11 and 13) and engages the wall 19a until the adjustment member 34 is situated in the area 35 defined by the cylindrical wall portion 19 of rear end lamina tube 18. The amount of force required to slide the adjustment member 34 inside the wall 19a is less than approximately one pound in the embodiment described.

Figure 3:
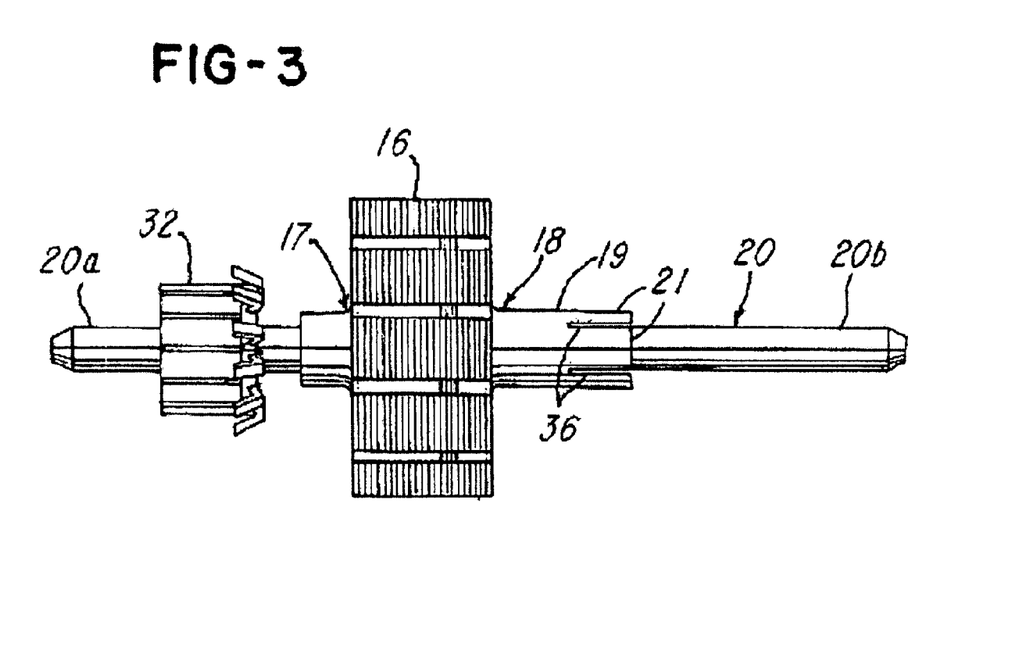
FIG. 3 is a view of an armature assembly before windings are applied.
Figure 4:
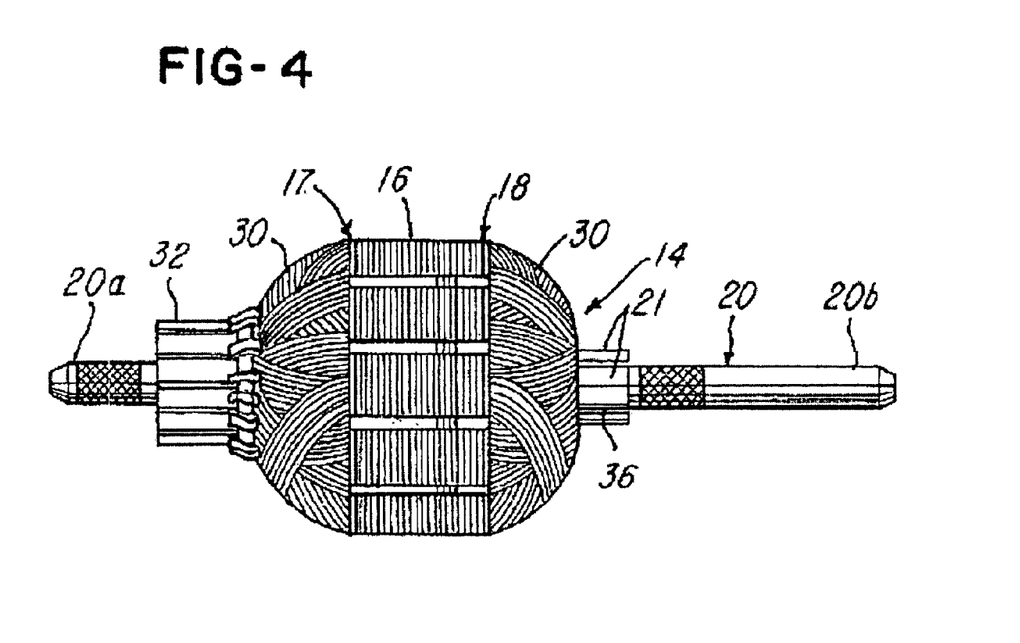
FIG. 4 is a view of the armature assembly after windings are applied.

As best illustrated in FIG. 3, a commutator 32, front end lamina 17, plurality of lamina 16, and rear end lamina 18 are situated on armature shaft 20. Thereafter, the windings 30 are applied to provide the armature assembly 14 (FIGS. 1 and 4).

As noted earlier and as best illustrated in FIGS. 6, 7, 11 and 16, note that the cylindrical portion 19 of the end lamina 18 is segmented with the plurality of openings 36 to define the segments 21 that flex to receive the adjustment member 34, as illustrated in FIG. 6. During assembly, the armature assembly 14 is then situated in the housing 26, as illustrated in FIG. 1, until an end 20a of shaft 20 is received in the bearing 24.

FIGS. 10–13 illustrate other features of the end lamina 18.

As best shown in FIGS. 1, 2 and 5, the motor 10 further comprises an end cap assembly 42 comprising an end cap 41 having the bearing 22 situated therein and held in place with a retainer 44. The end cap assembly 42 is situated over end 20b of armature shaft 20 until an end 22a (FIG. 2) of bearing 22 engages an end 34a. During assembly of the motor 10, the end cap assembly 42 is moved in the direction of arrow 46 in FIG. 2 until shaft end 20b is situated through bearing 22 and an opening 41a of end cap 41. An end 34a of adjustment member 34 engages end 22a of bearing 22. Note that the end cap assembly 42 is moved until end 34a of the adjustment member 34 is pushed into the aperture 35 (FIG. 7) until the end cap 41 can be secured to the housing 26. After the end cap assembly 42 is permanently secured to the housing 26, the cylindrical wall portion 19 of the end lamina 18 is secured to the outer surface 34b of the adjustment member 34 by suitable means, such as by use of an adhesive or laser weld. In the embodiment being described, the adjustment member 34 is a polymer material and the wall portion 19 of end lamina 18 is a polymer material, but it should be understood that either or both may be metal or polymer.

Figure 8:
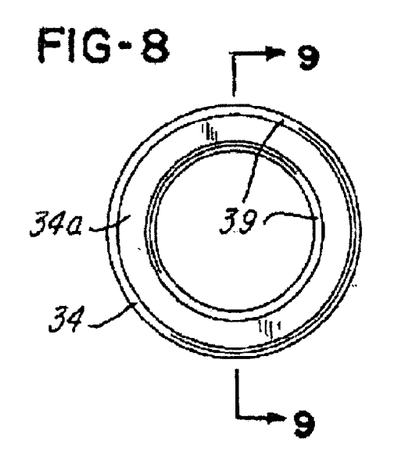
FIG. 8 of the invention is an end view of the adjustment member.
Figure 9:
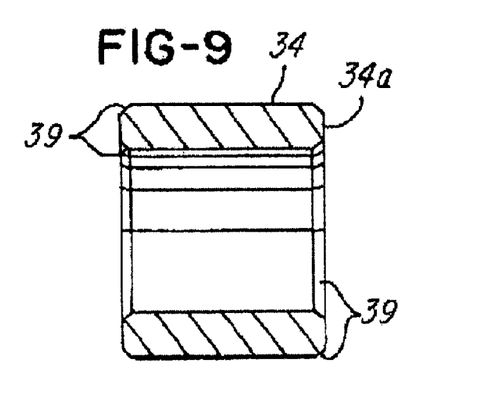
FIG. 9 is a sectional view taken along the line 9—9 in FIG. 8.
Figure 10:
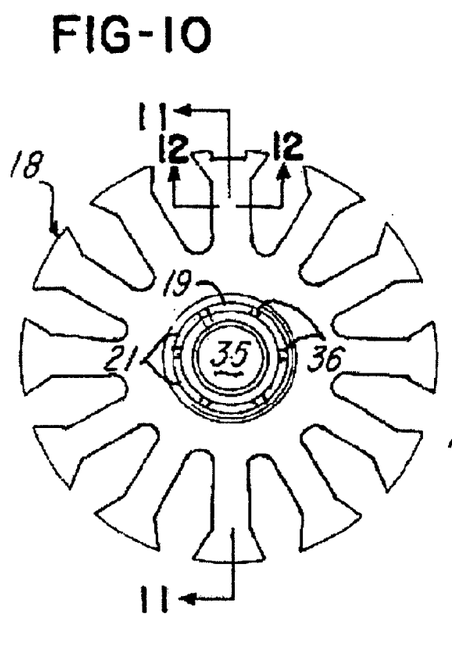
FIG. 10 is an end view of the end lamina tube.

To facilitate sliding the adjustment member 34 on to shaft 20 and into the opening 35 (FIG. 7), the adjustment member 34 may comprise chamfered edges 39 (FIGS. 8 and 9).

Note that the end play defined by the axial distance D (FIG. 5) between end 34a of adjustment member 34 and end 22a of bearing 22 can be adjusted to a desired end play distance D by changing or adjusting the position of the adjustment member 34 in the member 19. Alternatively, the end play distance D can be made to be zero or close to zero, which means that the end 34a may engage and rotate against the end 22a of bearing 22 when the shaft rotates. A wear washer (not shown) may also be between end 22a of bearing 22 and end 34a of tube 34.

Advantageously, the invention enables the adjustment of the end play distance D to a predetermined or desired amount. In the embodiment being described, it has been determined that one advantageous distance is between about 0.004–0.008 inch. For example, in one illustrative embodiment the end play distance could be 0.004 inch or even less. Reducing or eliminating the end play distance D entirely facilitates reducing or eliminating axial movement of the armature assembly 14 (FIG. 1). This, in turn, facilitates reducing undesired noise and/or vibration.

After the end play distance D is adjusted to either zero or some desired distance, the tube 19 is secured to the adjustment member 34 by suitable means, such as a laser spot or circumferential weld mentioned earlier as diagrammatically illustrated with laser beams 60 in FIG. 5. The end cap assembly 42 was previously attached to the housing 26 by forming metal tabs 48 on the housing 26 over the end cap assembly 42 (FIG. 1).

Although not shown, it should be appreciated that the end lamina 18 and cylindrical portion 19 could be fastened onto the adjustment member 34 by any suitable means such as adhesive, laser weld, ultrasonic weld, staking (i.e., forcing one material into the other), screwing (i.e., screwing a screw through the lamina 18 and adjustment member 34, magnetic forming (on material magnetically forced into the others) or the like. Also, the reverse concept of having fingers on the tube 35 sliding over a round tube 19 (which in the embodiment referred to above has the fingers) should be protected. It should be understood that the plurality of slots 36 are not required, but may be incorporated to facilitate assembly of the motor. Certainly, just two round continuous tubular members could be used, or two of any type of shape (triangular, octagonal, and such) that telescope one inside of the other could also be used.

Referring now to FIGS. 14–21, an electric motor 100 is shown illustrating other features of the invention. The motor 100 comprises the same or similar components as the motor 10 illustrated in FIGS. 1–13 and those same or similar components have been identified with the same part numbers except that a prime ("'") mark has been added to the parts shown in FIGS. 14–21.

The motor 100 comprises a bearing retainer 102 which is multi-functional in that it is capable of retaining a bearing 104 (FIG. 15), setting endplay in a manner similar to the embodiment illustrated in FIGS. 1–13, and retaining a plurality of brushes 108 and 110 in a brush holder assembly 112 (FIG. 16) in an open position, for example, during shipping. Details of the various components of the motor 100 will now be described.

Figure 20A:
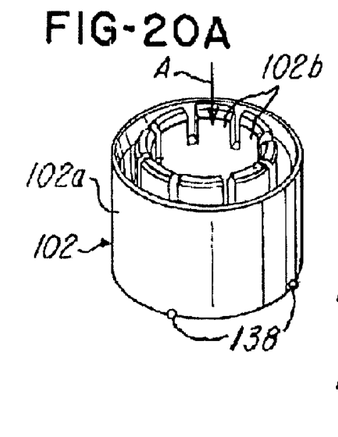
FIGS. 20A–20C are further views of a bearing retainer.
Figure 20B:
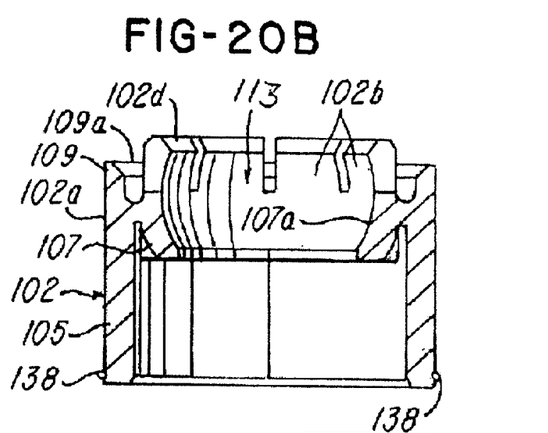
Figure 20C:
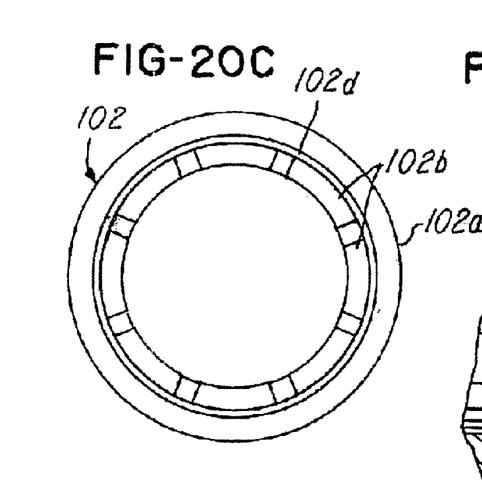

The motor 100 comprises an end cap 115 (FIGS. 14 and 15) and a hub 116 that is generally cylindrical and receives the bearing retainer 102 which houses the bearing 104 mentioned earlier. As illustrated in FIG. 20B, the retainer 102 comprises a cylindrical wall 102a that is integrally formed with an arcuate-shaped interior wall 102b having the inner wall surface 107a. FIG. 20C illustrates a view in the direction of arrow A in FIG. 20A showing further details of the retainer 102. The wall 107 is slotted to define a plurality of fingers 102b. The wall also comprises a chamfered edge 102d (FIG. 20B) to facilitate mounting the bearing 104 in an opening 113. Note that the wall 102 comprises an outer surface 102a (FIG. 20B) that defines an outer diameter that is dimensioned to be slip fit and received within the wall 134 (FIG. 21) of hub 116.

Figure 15:
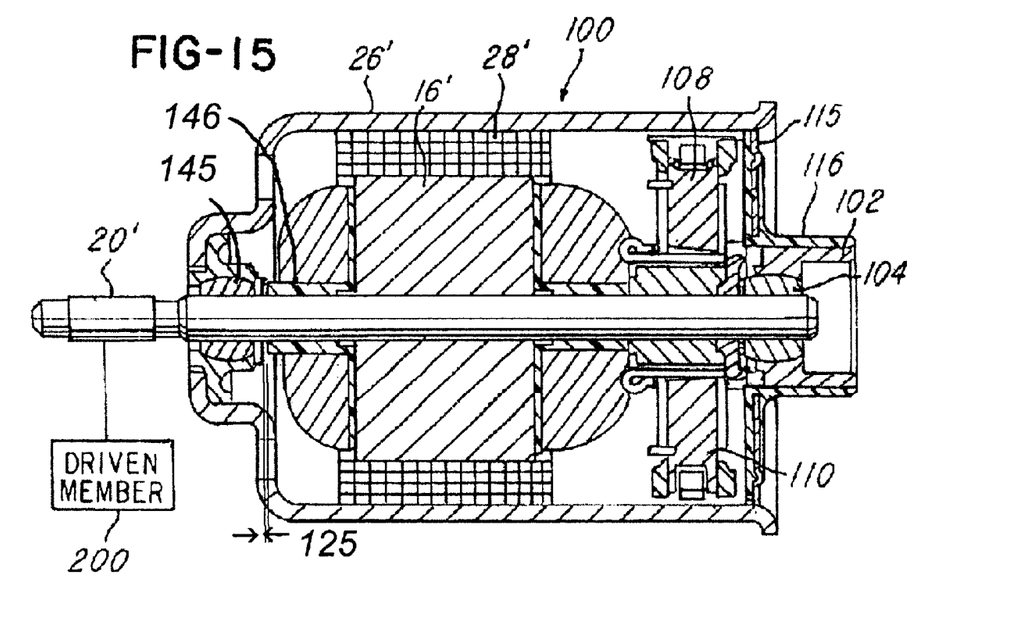
FIG. 15 is a sectional view of the motor shown in FIG. 14.
Figure 16:
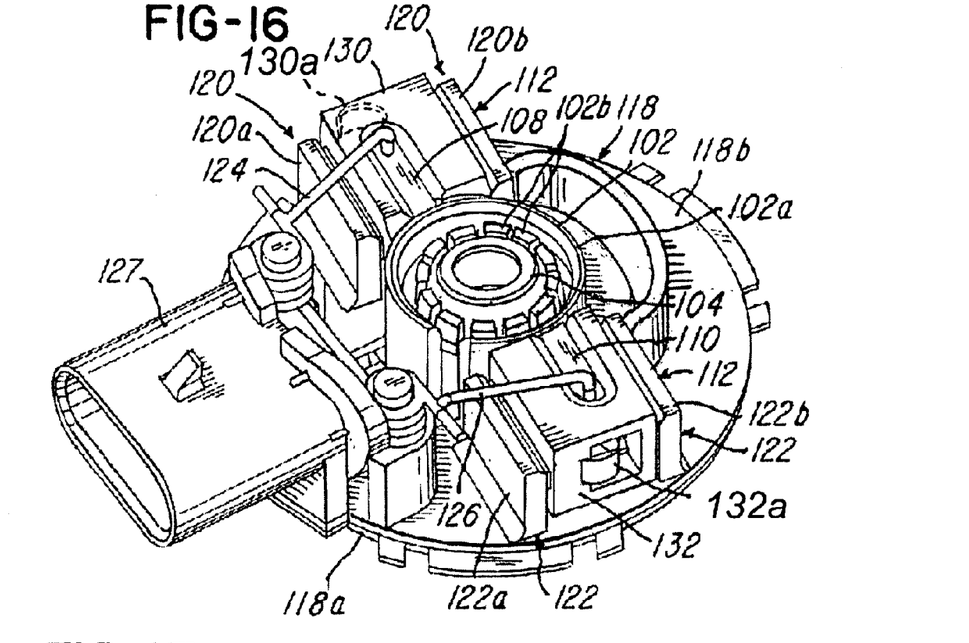
FIG. 16 is a view of an over-molded end cap.
Figure 17:
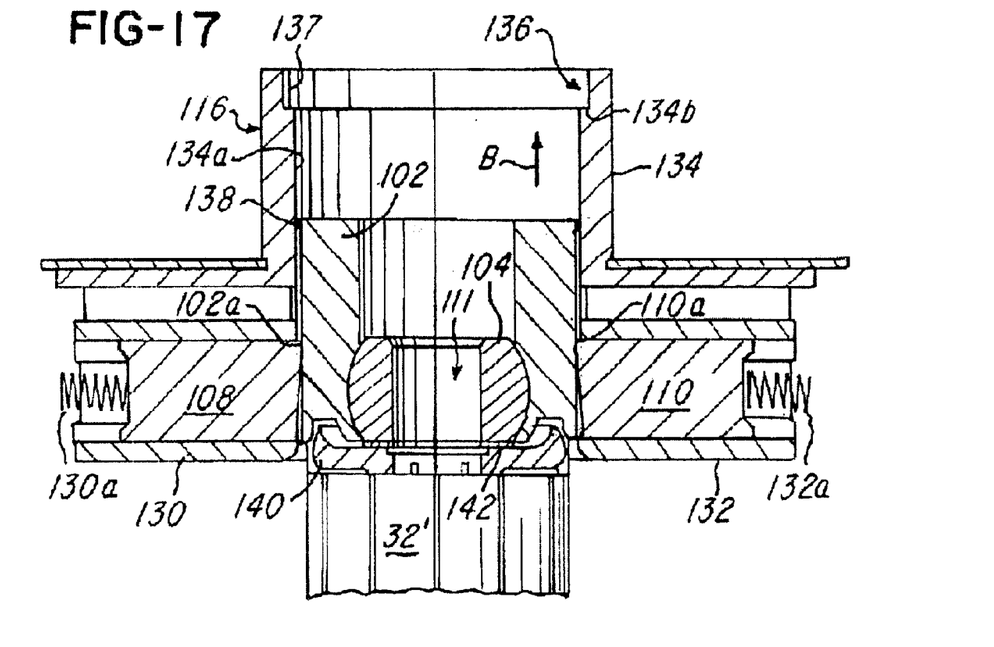
FIG. 17 is a fragmentary sectional view of the over-molded end cap.

The brush holder assembly 112 comprises the end cap 115 having an end plate cap 118 (FIGS. 15 and 19A) that is over-molded in plastic. As illustrated in FIG. 17, the over-molded cylindrical wall 134 defines the hub 116 having a recessed channel wall 137 defining a recessed channel 135 whose function will be described later herein. After the over-molding process, the end plate cap 118 comprises a first side 118a having the hub 134 (FIG. 19D) and a second side 118b (FIG. 16) comprising a plurality of walls 120a and 120b that form a brush housing retainer 120 and walls 122a and 122b that form brush housing retainer 122. The brush housing retainers 120 and 122 receive the brush housings 130 and 132, respectively, comprising the brushes 108 and 110, as best illustrated in FIG. 16. The brushes 108 and 110 are coupled to the power supply (not shown) via a pair of conductors 124 and 126 as shown. Although not shown, it should be understood that between the brush housing retainers and the brush housings, one or more small cylindrical or other shape rubber elements may be provided to facilitate reducing vibration and noise As shown in FIG. 19B, the side 118b further comprises an arcuate wall 136 (FIG. 19B). The side 118b further comprises a connecter interface 127 that receives a male connector (not shown). Note that the plate 118 (FIG. 19A) comprises a plurality of attaching buttons 118d to facilitate a secure over-molding of the hub 116 and brush housing retainers 120 and 122 thereto.

The brushes 108 and 110 are received in the brush retainers 130 and 132, respectively, and each comprise an associated spring 130a and 132a for urging the brushes 108 and 110 toward the commutator 32'.

FIG. 16 illustrates the end cap assembly 112 during, for example, shipping when the brushes 108 and 110 are retained in an open position (illustrated in FIGS. 16 and 17). An outer wall 102a of bearing retainer 102 retains the bearing 104 and simultaneously retains the brushes 108 and 110 in the position shown.

Figure 18:
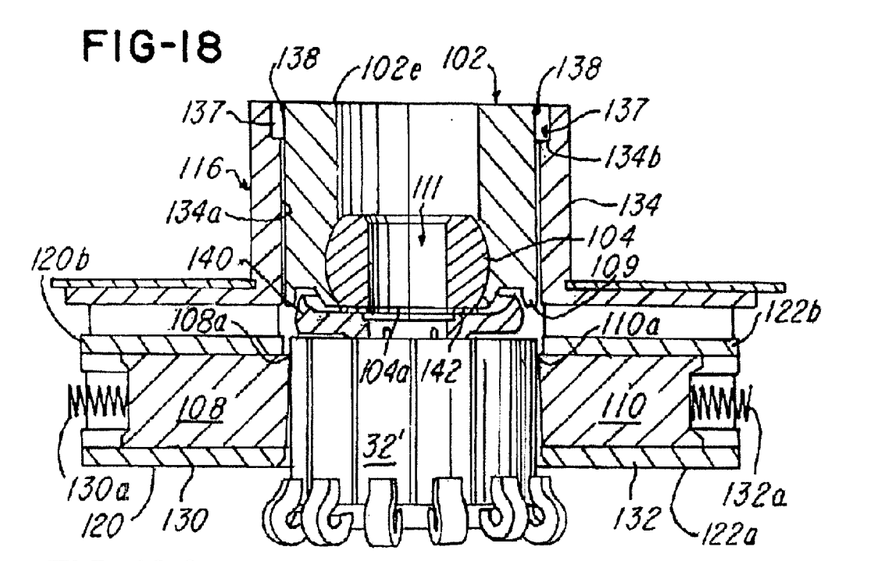
FIG. 18 is another fragmentary sectional view of the over-molded end cap.

The bearing retainer 102 and wall surface 102a may further comprise a plurality of projections 138 (FIGS. 17, 18 and 20A) situated on the surface 102a. The projections 138 cooperate with an inner wall surface 134a (FIG. 17) of wall 134 of hub 116 to retain the retainer 102 in the positions illustrated in FIGS. 16 and 17 when it is desired to retain the brushes 108, 110 in the open position. After the retainer 102 is moved from the open position shown in FIG. 17 to the position illustrated in FIGS. 15 and 18, the projections 138 become received in the recessed area, as best illustrated in FIG. 18. This permits the retainer 102 to move freely in the direction of arrow B in FIG. 17 after the commutator 32' is moved toward bearing 104 during assembly. As illustrated in FIG. 17, note that the commutator 32' comprises a slinger 140 and a wear washer 142 that forces the bearing retainer 102 in the direction of arrow B.

The outer diameter defined by wall 102a (FIG. 20B) is dimensioned to be slidably received within inner wall 134a (FIG. 19D) of hub 116. As mentioned earlier herein, the embodiment illustrated functions to retain the brushes 108 and 110 in the open position illustrated in FIG. 16 during, for example, shipping. The retainer 102 functions in a manner similar to the adjustment member 34 described earlier herein relative to the embodiment shown in FIGS. 1–13. Namely, after the brushes 108, 110 are mounted in brush housings 130 and 132, and housings 130 and 132 are received in the brush housing retainers 120 and 122 with rubber elements (not shown) between them, the bearing retainer 102 slidably receives armature 20' (FIG. 15). As the armature 20' is guided through a bearing aperture 111 (FIGS. 17 and 18 of bearing 104), the washer 142 engages the bearing 104 and forces it and the bearing retainer 102 in the direction of arrow B (FIG. 17) until it is in the position shown in FIG. 18.

Figure 21:
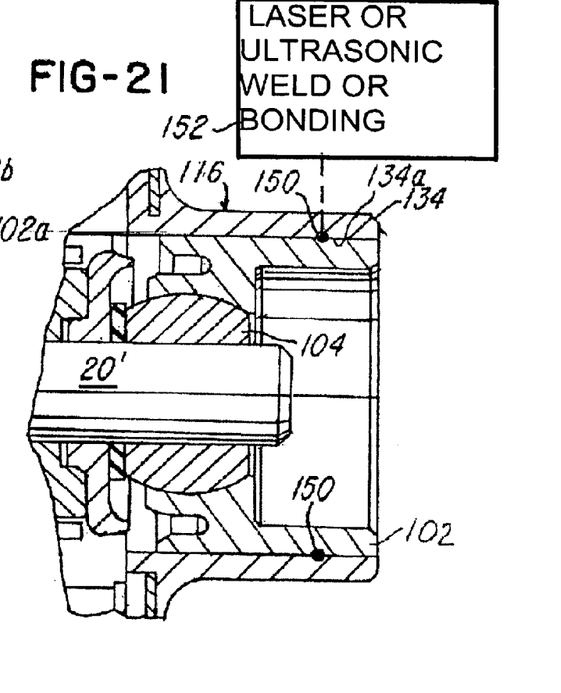
FIG. 21 is a view illustrating a weld between a hub of the over-molded end cap and the bearing retainer shown in FIGS. 20A–20C.

As end cap 115 and housing wall 26' (FIG. 15) are brought together during assembly, the washer 142 and slinger 140 are driven until the projections 138 are driven past edge 134b (FIGS. 17 and 18) and are received in area 137. Thereafter, end cap 115 and housing 26' are in a final assembled position, and then are attached in a suitable manner, such as metal tabs (not shown). As mentioned earlier, the surface 102a of retainer 102 is dimensioned to be slidably, but snugly, received within the inside wall 134a (FIG. 19D) of hub 134, as illustrated in FIGS. 18 and 21.

As illustrated in FIGS. 20A–20C, the retainer 102 comprises a wall portion 109 (FIG. 20B) that surrounds the detents or fingers 102b. When an end 109a (FIG. 18) of wall portion 109 clears the walls 120b and 122b (FIG. 18) and the corner or edge 108a (FIG. 18) of brush 108 and edge 110a of brush 110, then the brushes 108 and 110 are released to move toward and engage the commutator 32'. In this regard, the springs 130a and 132a force or bias the brushes 108 and 110, respectively, toward the commutator 32' so that the brushes are in continuous contact therewith in a manner conventionally known.

Figure 14:
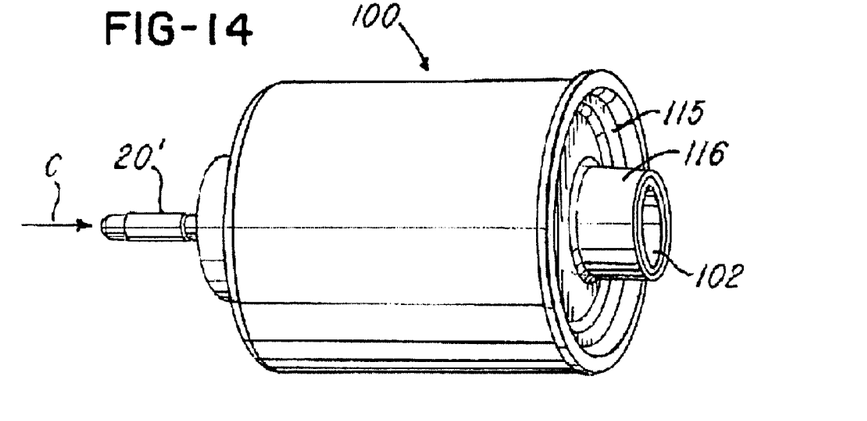
FIG. 14 is a view of another embodiment.
Figure 19A:
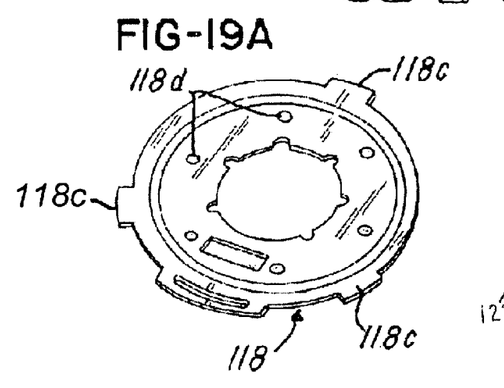
FIGS. 19A–19D are various views showing features of the end caps.
Figure 19B:
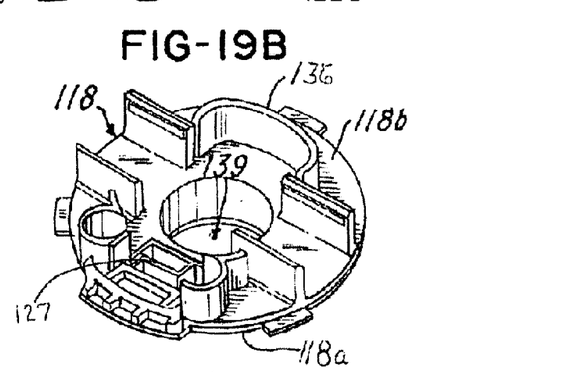
Figure 19C:
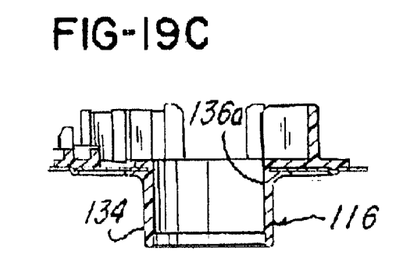
Figure 19D:
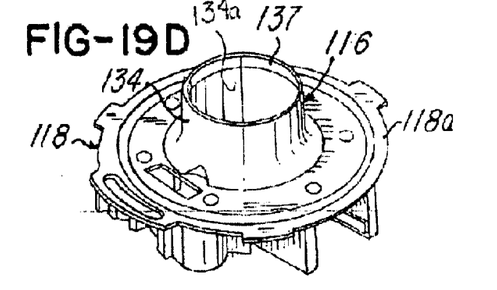

After the retainer 102 has moved sufficient distance to release the brushes 108 and 110 toward and into engagement with the commutator 32', as illustrated in FIGS. 15 and 18, the end plate 118 is secured, welded, staked or fastened to the housing 26' by, for example, bending tabs on 26' (not shown) over the flanges 118c (FIG. 19A). In this regard, the flanges 118d may be received in corresponding slots or receiving areas (not shown) of motor housing 26' (FIGS. 14 and 15).

After end cap 118 is staked, welded or fastened to housing 26', a small force in the direction of arrow C (FIG. 14) is applied. As the shaft 20' is moved to the right (as viewed), the retainer 102 is moved outbound (toward the right as viewed in FIG. 14). This provides clearance 125 (FIG. 15) between the left-side bearing 145 (as viewed) and the armature end lamina tube 146. This movement is applied to the shaft 20' until an endplay or gap 125 between the bearing 145 in FIG. 15 and the end lamina tube 146 is at a desired distance. Thus, if zero endplay is desired, then the retainer 102 would be forced in the opposite direction of arrow C (FIG. 14) until the end 104a (FIG. 18) is in full engagement with washer 142 eliminating any endplay distance or gap 125 (FIG. 15) between bearing 145 and end lamina 146. If a slight amount of endplay is desired, the retainer 102 is first set to zero end play, as above, to establish a reference point, and then moved outward by pulling on the retainer, or pushing the opposite end of the shaft 20' inward the desired amount to achieve some amount of endplay.

After the retainer 102 is moved to the desired position within the hub 116, the hub 116 is secured to the retainer 102 in a manner similar to that described earlier herein relative to the first embodiment. For example and as illustrated in FIG. 21, a plurality of spot welds 150 may be provided by a welder 152 (FIG. 21), which may be an ultrasonic or laser welder to secure or weld the wall 134a of hub 134 directly to the surface 102a of retainer 102. This causes the retainer 102 to be secured and affixed to the hub 116. Note that a through-transmission laser welding process may also be used of the type shown and described earlier herein relative to the embodiment shown in FIG. 5. It should be understood that through-transmission laser welding is a process where the laser beam passes through the outside material dispersing very little energy, but upon hitting the inner surface which is purposely made absorbent, dissipates heat, causing a melt zone which fuses the two pieces of plastic together.

It should also be appreciated that the hub 116 could also comprise a plurality of slotted fingers, similar to the projections or fingers 21 (FIG. 6) that with a small force (approximately 0.1–2 pounds) engage the outer wall 102a of retainer 102, thereby removing any gap between 102a and 134a, potentially improving the welding process.

As shown in FIG. 15, the motor 100, as with the motor 10 of the embodiment in FIGS. 1–13, may be coupled to and used to drive a driven member 200, which may be used as a window lift motor, seat motor, door lock motor, wiper motor, or other suitable driven member, such as a blower wheel or fan.

Advantageously, this system and method provide a bearing retainer 102 that is capable of retaining brushes, such as brushes 108 and 110, in an open position of the type illustrated in FIGS. 16 and 17. This may be beneficial during shipping or even manufacturing of the motor 100. The retainer 102 (FIG. 21) also cooperates with the hub 116 to adjust endplay to a desired amount, such as zero or up to a minimal amount (i.e. 0.5 inches). The retainer 102 has yet another feature in that it retains the bearing 104 in a retained position during assembly and use. Thus, the retainer 102 comprises and defines an assembly and approach for accomplishing multiple functions with a minimal amount of parts.

While the system and method described, constitute preferred embodiments of this invention, it is to be understood that the invention is not limited to this precise system and method, and that changes may be made in either without departing from the scope of the inventions, which is defined in the appended claims.

What is claimed is:

1. A method for controlling an end play distance in an electrical motor, said electric motor comprising a motor housing for receiving a stator operatively associated with a rotor mounted on an armature when the armature is received in the motor housing, said motor comprising a lamina stack and an end lamina member, said lamina stack being operatively related to said stator when said rotor is situated in said housing, said method comprising the steps of:

providing an adjustment member dimensioned to be received on the armature and be received in said end lamina member;

slidably mounting said adjustment member onto said armature;

positioning the end lamina member onto said armature having said lamina stack until at least a portion of said adjustment member is received within said end lamina member, thereby providing an armature assembly;

positioning the armature assembly in said motor housing; situating an end cap on said motor housing until a bearing engages said adjustment member; and securing said end lamina member onto said adjustment member.

2. The method as recited in claim 1 wherein said end lamina member is dimensioned to permit said end lamina member to slide on an outer diameter of said adjustment member while staying in substantially the same position on said armature shaft.

3. The method as recited in claim 1 wherein said adjustment member slides onto said armature with less force than is required to slide said adjustment member into said end lamina member.

4. The method as recited in claim 3 wherein said force required to slide is less than one pound.

5. The method as recited in claim 1 wherein said method further comprises the step of:

providing an end lamina member comprising a plurality of slots to facilitate receiving said adjustment member therein.

6. The method as recited in claim 1 wherein said method further comprises the step of:

providing an end lamina member that comprises no slots.

7. The method as recited in claim 1 wherein said method further comprises the step of:

providing an adjustment member having a plurality of fingers to permit gripping the end lamina member.

8. The method as recited in claim 1 wherein said method further comprises the step of:

providing an end lamina member comprising a plurality of fingers to facilitate gripping said adjustment member.

9. The method as recited in claim 1 wherein said adjustment member is a polymer and is welded onto said end lamina member.

10. The method as recited in claim 9 wherein said adjustment member is laser welded onto said end lamina member.

11. The method as recited in claim 1 wherein said end lamina member is a polymer and is affixed to said adjustment member with an adhesive.

12. The method as recited in claim 1 wherein said end lamina member and said adjustment member are both polymers.

13. The method as recited in claim 1 wherein said end lamina member and said adjustment member are both metallic.

14. The adjustment member as recited in claim 1 wherein one of said second member or said adjustment member is metallic and the other is a polymer.

15. The method as recited in claim 1 wherein said end play distance is less than 0.5 inch.

16. The method as recited in claim 4 wherein said end play distance is less than 0.5 inch.

17. The method as recited in claim 1 wherein said method further comprises the step of:

moving said armature a desired amount until an end play distance reaches a desired end play distance before said securing step.

18. The method as recited in claim 1 wherein said desired end play distance is zero.

19. The method as recited in claim 4, wherein said end play distance is greater than zero but less than 0.5 inch.

20. The method as recited in claim 1 wherein said end lamina member and said adjustment member are both cylindrical tubular members.

21. The adjustment member as recited in claim 1 wherein said end lamina member is cylindrical.

22. The adjustment member as recited in claim 1 wherein said end lamina member comprises multiple sides.

23. The method as recited in claim 1 wherein said end lamina member is slotted.

24. The method as recited in claim 1 wherein said adjustment member is cylindrical.

25. The method as recited in claim 1 wherein said securing step is accomplished by stacking, magnetic forming or screwing said end lamina member onto said adjustment member.

* * * * *

UNITED STATES PATENT AND TRADEMARK OFFICE
CERTIFICATE OF CORRECTION

| | | |
|---|---|---|
| PATENT NO. | : 6,880,231 B2 | |
| APPLICATION NO. | : 10/651873 | |
| DATED | : April 19, 2005 | |
| INVENTOR(S) | : Robert Campbell, James Joseph Misner and Russell Clint Proctor | |

It is certified that error appears in the above-identified patent and that said Letters Patent is hereby corrected as shown below:

On the title page, item (75) please change the address of Robert Campbell from Apex, NC (US) to Tecumseh, Ontario (CA)

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 6,880,231 B2
APPLICATION NO. : 10/651873
DATED : April 19, 2005
INVENTOR(S) : Robert Campbell, James Joseph Misner and Russell Clint Proctor It is certified that error appears in the above-identified patent and that said Letters Patent is hereby corrected as shown below:

On the Title Page, item [57] in the Abstract, Line 9, delete "endplay" and insert -- end play -- therefor.

In Column 1, Line 55, delete "endplay" and insert -- end play -- therefor.

In Column 5, Line 3, delete "endplay" and insert -- end play -- therefor.

In Column 6, Line 67, delete "endplay" and insert -- end play -- therefor.

In Column 7, Line 2, delete "endplay" and insert -- end play -- therefor.

In Column 7, Line 5, delete "endplay" and insert -- end play -- therefor.

In Column 7, Line 7, delete "endplay" and insert -- end play -- therefor.

In Column 7, Line 11, delete "endplay" and insert -- end play -- therefor.

In Column 7, Line 47, delete "endplay" and insert -- end play -- therefor.

In Claim 2, Column 8, Line 19, delete "shaft".

In Claim 14, Column 8, Line 59, delete "adjustment member" and insert -- method -- therefor.

In Claim 14, Column 8, Line 60, 1st occurrence, delete "said".

In Claim 21, Column 9, Line 11, delete "adjustment member" and insert -- method -- therefor.

In Claim 22, Column 10, Line 1, delete "adjustment member" and insert -- method -- therefor.

Signed and Sealed this

Fifth Day of January, 2010

David J. Kappos
*Director of the United States Patent and Trademark Office*